(12) United States Patent
Zhang et al.

(10) Patent No.: US 12,386,399 B2
(45) Date of Patent: Aug. 12, 2025

(54) MAIN SWING ARM, ROTATING SHAFT MECHANISM, AND FOLDABLE MOBILE TERMINAL

(71) Applicant: HONOR DEVICE CO., LTD., Shenzhen (CN)

(72) Inventors: Yaolei Zhang, Shenzhen (CN); Mingqian Gao, Shenzhen (CN); Guotong Zhou, Shenzhen (CN); Haifei Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/255,905

(22) PCT Filed: Sep. 8, 2022

(86) PCT No.: PCT/CN2022/117732
§ 371 (c)(1),
(2) Date: Jun. 5, 2023

(87) PCT Pub. No.: WO2023/051209
PCT Pub. Date: Apr. 6, 2023

(65) Prior Publication Data
US 2024/0302869 A1    Sep. 12, 2024

(30) Foreign Application Priority Data

Sep. 30, 2021    (CN) .......................... 202111163603.X

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)

(58) Field of Classification Search
CPC .. H04M 1/022; H04M 1/0268; H04M 1/0216; G06F 1/1681; G06F 1/1616; G06F 1/1652
See application file for complete search history.

(56) References Cited

U.S. PATENT DOCUMENTS

| 10,664,021 B1 | 5/2020 | Hsu et al. |
| 11,336,759 B2 | 5/2022 | Liao et al. |

(Continued)

FOREIGN PATENT DOCUMENTS

| CN | 207777905 U | 8/2018 |
| CN | 209375705 U | 9/2019 |

(Continued)

*Primary Examiner* — Tuan D Nguyen
(74) *Attorney, Agent, or Firm* — Fish & Richardson P.C.

(57) ABSTRACT

Disclosed are a main swing arm, a rotating shaft mechanism, and a foldable mobile terminal. The rotating shaft mechanism provided in embodiments of this application is mainly applied to a foldable mobile terminal, so as to implement unfolding and folding of two main parts of the mobile terminal. A rotating body used by a main swing arm to cooperate with a slide of a support to slide includes a first rotating segment and a second rotating segment. In a folded state, the first rotating segment is not separated from the slide of the support, and the second rotating segment can meet a requirement of supporting a floating plate in an unfolded state in a screen supporting position, and an inner end of the first rotating segment can be accommodated in an opening of a floating plate and does not interfere with the floating plate.

20 Claims, 9 Drawing Sheets

(56) References Cited

U.S. PATENT DOCUMENTS

| | | |
|---|---|---|
| 11,455,017 B2 | 9/2022 | Liu |
| 11,467,633 B2 | 10/2022 | Liao et al. |
| 2003/0162509 A1 | 8/2003 | Bae et al. |
| 2020/0137907 A1 | 4/2020 | Kang et al. |
| 2020/0281085 A1 | 9/2020 | Jia |
| 2021/0247815 A1 | 8/2021 | Shim et al. |
| 2021/0271294 A1 | 9/2021 | Liao et al. |
| 2022/0116489 A1 | 4/2022 | Nagai et al. |
| 2022/0353355 A1 | 11/2022 | Liao et al. |
| 2023/0075646 A1 | 3/2023 | Niu et al. |

FOREIGN PATENT DOCUMENTS

| | | |
|---|---|---|
| CN | 210836896 U | 6/2020 |
| CN | 111692196 A | 9/2020 |
| CN | 111698355 A | 9/2020 |
| CN | 112153178 A | 12/2020 |
| CN | 112751961 A | 5/2021 |
| CN | 112995368 A | 6/2021 |
| CN | 113067923 A | 7/2021 |
| CN | 113141422 A | 7/2021 |
| CN | 113194183 A | 7/2021 |
| CN | 113225412 A | 8/2021 |
| CN | 113315860 A | 8/2021 |
| CN | 214247981 U | 9/2021 |
| CN | 115002247 A | 9/2022 |
| JP | 2014072617 A | 4/2014 |
| TW | M607728 U | 2/2021 |

MAIN SWING ARM, ROTATING SHAFT MECHANISM, AND FOLDABLE MOBILE TERMINAL

CROSS-REFERENCE TO RELATED APPLICATIONS

This application is a national stage of International Application No. PCT/CN2022/117732 filed on Sep. 8, 2022, which claims priority to Chinese Patent Application No. 202111163603.X, filed on Sep. 30, 2021. The disclosures of the aforementioned applications are hereby incorporated by reference in their entireties.

TECHNICAL FIELD

This application relates to the field of mobile terminal technologies, and in particular, to a main swing arm, a rotating shaft mechanism, and a foldable mobile terminal.

BACKGROUND

With development of flexible display technologies, foldable mobile terminals have emerged. A foldable mobile terminal usually includes a left housing, a right housing, a rotating shaft mechanism, and a flexible display. The flexible display covers the left housing and the right housing, and both the left housing and the right housing may rotate around the rotating shaft mechanism, so as to be folded together or unfolded.

The current rotating shaft mechanism mainly includes a main support, a swing arm, a left door plate, and a right door plate. The left door plate and the right door plate are respectively rotatably connected to both sides of the main support by using the swing arm, and the left housing and the right housing are respectively fastened to the left door plate and the right door plate. In addition, a floating plate is further disposed on the main support, and is located between the left door plate and the right door plate. The floating plate is not fixedly connected to the flexible display. In a process of folding or unfolding the left housing and the right housing, the floating plate may move up and down relative to the main support. When the left housing and the right housing are unfolded to 180 degrees, the floating plate is located at a highest position. In this way, the floating plate can support a bending part of the flexible display.

In the current technology, based on different connection manners to a door plate and functions, swing arms in the rotating shaft mechanism mainly fall into two types: A main swing arm and an auxiliary swing arm. Inner ends of the main swing arm and the auxiliary swing arm are both rotatably connected to the main support, an outer end of the main swing arm is connected to the door plate on the corresponding side, and the auxiliary swing arm cooperates with the door plate to slide, so as to guide rotation of the door plate. In the current technology, the inner end of the main swing arm is provided with an arc-shaped segment, and the main support is provided with an arc-shaped slide, and the arc-shaped segment slides reciprocally in the arc-shaped slide, to implement relative folding and unfolding of the main swing arm and the support. To prevent the arc-shaped segment from sliding out of the support during folding, a center angle of the arc-shaped segment is usually large. In this way, when the main swing arm is in an unfolded state, an inner edge position of the arc-shaped segment of the main swing arm is higher than a lower surface of the floating plate. In addition, the main swing arms are usually disposed symmetrically on the left side and the right side. When the main swing arms are in the unfolded state, a distance between the arc-shaped segments of the two main swing arms is also short. Therefore, in the current technology, no floating plate is disposed between the two main swing arms, or even if a floating plate is disposed between the two main swing arms, the floating plate in this part is not supported, stability of the floating plate is low; and support stability of the floating plate to the flexible display is also low:

SUMMARY

Embodiments of this application provide a main swing arm, a rotating shaft mechanism, and a foldable mobile terminal, where a floating plate can be stably supported in a screen supporting position. This improves stability of the floating plate in supporting a flexible display.

According to a first aspect, an embodiment of this application provides a main swing arm, applied to a rotating shaft mechanism of a foldable mobile terminal, and including a swing arm body. A first end of the swing arm body includes a rotating body that is configured to cooperate with a slide of the rotating shaft mechanism to rotate, and in an axial direction of the rotating body, the rotating body includes a first rotating segment and a second rotating segment. When the foldable mobile terminal is in a folded state, the first rotating segment can be at least partially located in the slide; and when the foldable mobile terminal is in an unfolded state, the second rotating segment can support at least a floating plate of the rotating shaft mechanism.

In this embodiment, the rotating body used by the main swing arm to cooperate with the slide of the support to slide includes a first rotating segment and a second rotating segment. The first rotating segment can meet a requirement that the first rotating segment is located in the slide of the rotating shaft mechanism when the foldable mobile terminal is in the folded state: that is, in the folded state, the first rotating segment is not separated from the slide. The second rotating segment can meet a requirement that the floating plate is supported in a screen supporting position in the unfolded state. An end of the first rotating segment can be accommodated in the opening of the floating plate and does not interfere with the floating plate. In this way, the floating plate in the main swing arm segment can be supported, overall stability of the floating plate can be improved, and a bending part of a flexible display is evenly stressed.

Based on the first aspect, an embodiment of this application further provides a first implementation of the first aspect:

In an axial direction of the rotating body, the rotating body includes at least one first arc-shaped body and at least one second arc-shaped body, the at least one first arc-shaped body and the at least one second arc-shaped body are coaxial and have a same cross section of a circular arc-shaped segment. A length of the circular arc-shaped segment of the at least one first arc-shaped body is greater than a length of a circular arc-shaped segment of the at least one second arc-shaped body: The first rotating segment includes the at least one first arc-shaped body, and the second rotating segment includes the at least one second arc-shaped body. arc-shaped surfaces on both sides of the at least one first arc-shaped body and the at least one second arc-shaped body are configured to cooperate with the slide to rotate. Each first arc-shaped body and each second arc-shaped body may be coaxially different. Each first arc-shaped body and each second arc-shaped body may be spaced in an axial direction, that is, to form a discontinuous surface, and certainly, to alternatively form a continuous surface. Each first arc-shaped body and each second arc-shaped body rotate in a circular arc-shaped shape, and a main swing arm is flexibly unfolded or folded.

Based on the first implementation of the first aspect, an embodiment of this application further provides a second implementation of the first aspect:

The rotating body includes an arc-shaped tube. The arc-shaped tube includes two side edges that extend in an axial direction, a side edge that is away from a first end of the swing arm body is provided with an opening, and a bottom wall of the opening is configured to support the floating plate of the rotating shaft mechanism that is in the unfolded state. The arc-shaped tube is a part of the tube, and a cross section is a sector-arc-shaped segment. The rotating body may be directly formed by using an existing tube, and a forming cost of the main swing arm is low.

Based on the first implementation of the first aspect the second implementation of the first aspect, an embodiment of this application further provides a third implementation of the first aspect:

A cross section of the first arc-shaped body is a first arc-shaped segment, and a center angle of the first arc-shaped segment is greater than or equal to 90 degrees. This can ensure that the first arc-shaped body is located as much as possible in the slide of the support, to prevent the first arc-shaped body from sliding out.

According to a second aspect, an embodiment of this application further provides a rotating shaft mechanism, applied to a foldable mobile terminal, and including a support, a floating plate, and an auxiliary swing arm, and further including the main swing arm according to the second aspect or any one of the implementation in the second aspect. A slide is disposed in the support, and when the rotating shaft mechanism is in a folded state, the first rotating segment is at least partially located in the slide; and when the rotating shaft mechanism is in an unfolded state, the second rotating segment supports the floating plate, and the floating plate includes an opening for avoiding the first rotating segment. In this embodiment, when the rotating shaft mechanism is in the unfolded state, an inner end of the first rotating segment is not higher than a mounting position of the flexible display.

Based on the second aspect, an embodiment of this application further provides a first implementation of the second aspect:

A first support block fastened to the auxiliary swing arm is further included, where the first support block includes a first support surface, and the floating plate includes a first support part that extends in a horizontal direction. When the auxiliary swing arm gradually unfolds, the first support surface rotates with the auxiliary swing arm to drive the floating plate to gradually move up and support the floating plate in a screen supporting position. In this way, in the unfolded state, the auxiliary swing arm and the main swing arm jointly support the floating plate, and the floating plate has many supporting points, and therefore stability is high.

Based on the first implementation of the second aspect, an embodiment of this application further provides a second implementation of the second aspect:

An inner end of the auxiliary swing arm is fixedly connected to a connecting shaft body, and the auxiliary swing arm is rotatably connected to the support by using the connecting shaft body: A second support block is further disposed at an end that is of the connecting shaft body and that is away from the first support block, and the second support block can rotate synchronously with the connecting shaft body. The second support block further includes a second support surface, and the floating plate includes a second support part that extends in a horizontal direction; and when the rotating shaft mechanism is in the unfolded state, the second support part of the floating plate is further supported on the second support surface.

In this embodiment, the first support block and the second support block that are fixedly connected to the auxiliary swing arm and the main swing arm can simultaneously support the floating plate in the unfolded state. The floating plate includes many supporting points in a length direction of the floating plate and is evenly stressed, and therefore stability is high.

Based on the second implementation of the second aspect, an embodiment of this application further provides a third implementation of the second aspect:

The second support block includes a mounting through hole, the connecting shaft body includes a mounting shaft segment that cooperates with the mounting through hole, a cross section of the mounting through hole is a non-circular structure, so as to limit circumferential rotation of the second support block relative to the hinge shaft body, and the second support block is positioned axially with the connecting shaft body by using a limiting member.

Based on any one of the second aspect, or the first to the third implementation of the second aspect, an embodiment of this application further provides a fourth implementation of the second aspect:

Two connecting plate assemblies are respectively connected to the left side and the right side of the support by using the main swing arm on the corresponding side, and are respectively configured to fasten two main body parts of the mobile terminal. An outer end of the auxiliary swing arm is slidably connected to the connecting plate assembly. The rotating shaft mechanism further includes a shaft cover. The shaft cover includes an inner cavity that includes an opening facing upwards. The support is at least partially mounted in the shaft cover cavity. At least one support protrusion is disposed on both sides of the shaft cover that extend in an axial direction, and is configured to support a connecting plate of the connecting plate assembly in the unfolded state. A disposing position, a length, and a quantity of the support protrusions on the shaft cover may be properly selected based on a specific structure of the rotating shaft mechanism. In this way, the support protrusions can improve the stability of the connecting plate to a certain extent.

Based on any one of the second aspect, or the first to the third implementation of the second aspect, an embodiment of this application further provides a fifth implementation of the second aspect:

A door plate sliding block and a connecting plate assembly that are located on both the left side and the right side of the support are further included, where the connecting plate assembly includes a connecting plate and a wedge-shaped mounting base that is fastened to the back of the connecting plate: an outer end of the auxiliary swing arm is slidably connected to the wedge-shaped mounting base: an inner end of the door plate sliding block is rotatably connected to the support, a sliding groove that cooperates with the door plate sliding block to slide is further provided on the back of the connecting plate; and when the rotating shaft mechanism is in the unfolded state, an inner end and an outer end of the door plate sliding block are located outside the sliding groove, and both abut against and support the connecting plate.

When the rotating shaft mechanism is in the unfolded state, the door plate sliding block is in a horizontal state, and both the inner end and the outer end of the door plate sliding block are located outside the sliding groove, and both abut against and support the connecting plate. That is, in the unfolded state, the inner end and the outer end of the connecting plate may be supported on the door plate sliding block in the horizontal state, to increase support stability of the connecting plate, so that a surface that is of the connecting plate and that is opposite to the flexible display is in a horizontal state.

According to a third aspect, an embodiment of this application further provides a foldable mobile terminal, including a flexible display and two main body parts, and further including the rotating shaft mechanism according to the second aspect or any one of the implementation in the second aspect, the two main body parts are connected by using the rotating shaft mechanism, the flexible display includes a fastening part and a bending part, at least a part of the bending part is opposite to the support, and the fastening part is fixedly connected to the main body parts.

BRIEF DESCRIPTION OF DRAWINGS

To describe technical solutions in embodiments of this application or in the conventional technology more clearly, the following briefly describes accompanying drawings required for describing embodiments or the conventional technology. Apparently, the accompanying drawings in the following description show some embodiments of this invention, and a person of ordinary skill in the art may still derive other drawings from these accompanying drawings without creative efforts.

DESCRIPTION OF EMBODIMENTS

The terms "first", "second", and the like are used herein for description only, and cannot be understood as indicating or implying relative importance or implicitly indicating the quantity of indicated technical features. Therefore, the features defined with "first", "second", and the like can explicitly or implicitly include one or more of the features.

Figure 5:
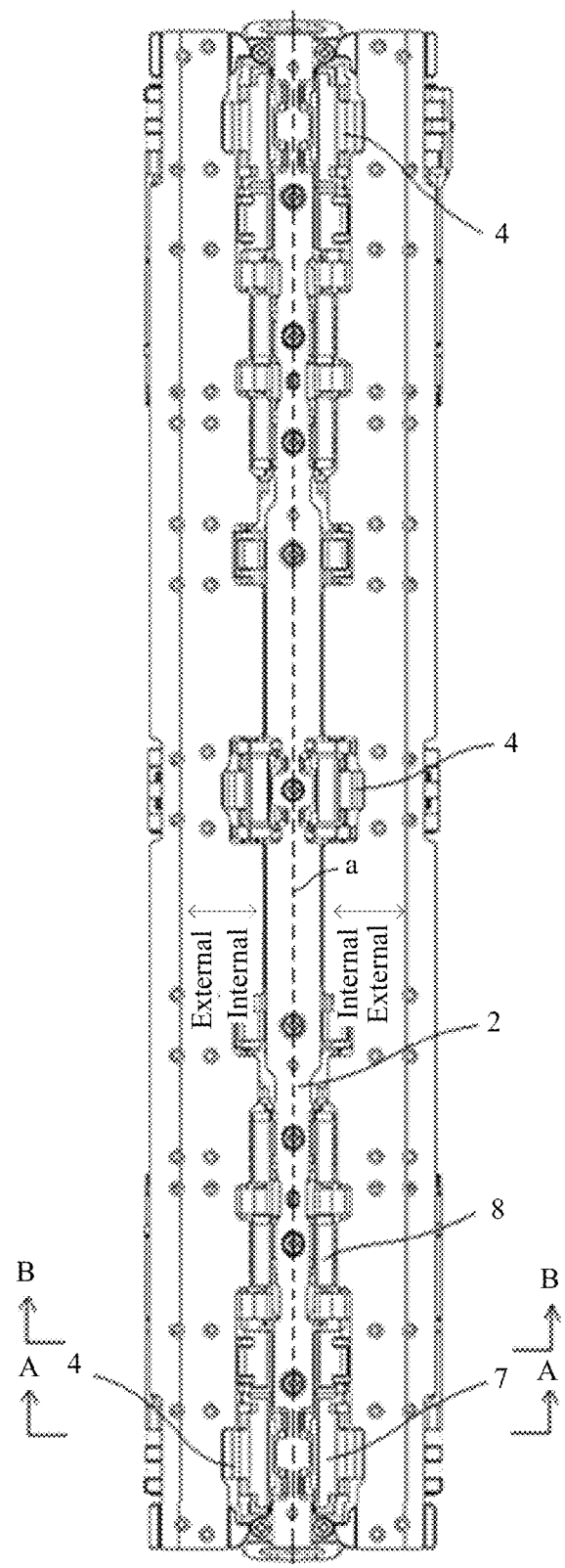
FIG. 5 is a top view of a rotating shaft mechanism in an unfolded state according to an embodiment of this application.
Figure 6:
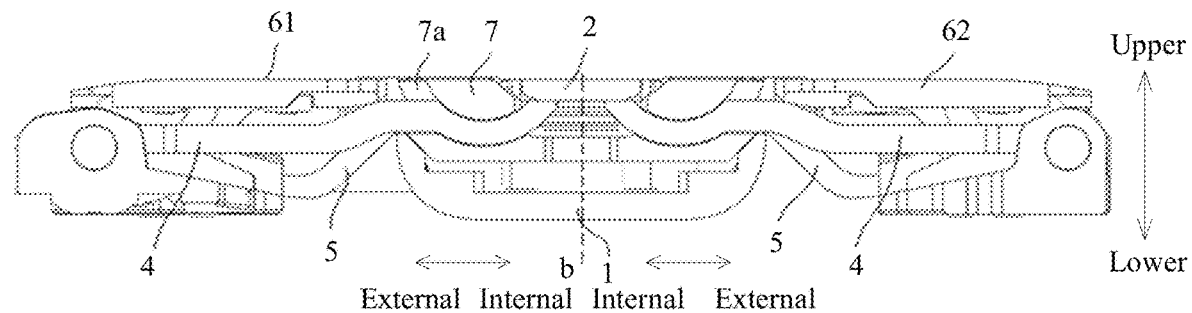
FIG. 6 is a sectional view taken along A_A in FIG. 5.

In addition, in this application, orientation terms such as "center", "top", "bottom", "inside", "outside", "front", and "back" are defined relative to positions or positions of components in the accompanying drawings. It should be understood that these orientation terms are relative concepts, and are used for description and clarification, but are not used to indicate or imply a specified apparatus or component must have a specified orientation, or be constructed and operated in a specific orientation. The orientation may be correspondingly changed based on changes in the orientations in which the components are placed in the accompanying drawings. Therefore, these orientation terms should not be construed as a limitation to this application. For example, in this application, a position close to the center line a of the rotating shaft mechanism 300 is defined "internal", and two sides corresponding to the remote center line a are defined as "external". Refer to FIG. 5 and FIG. 6. FIG. 5 and FIG. 6 show a center line a and a center line b. When a foldable mobile terminal is in the unfolded state, a direction close to the user is defined as "front", and a direction away from the user is defined as "back".

It should be further noted that identical or similar parts in embodiments of this application are represented by the same reference sign; and for a plurality of identical parts, it is possible that only one of the parts or components is marked with a reference sign as an example, and it should be understood that for other identical parts, the reference sign is also applicable.

The foldable mobile terminal provided in embodiments of this application may be a foldable mobile terminal product including a flexible display, such as a mobile phone, a tablet, a wearable device, an in-vehicle device, an augmented reality (augmented reality, AR)/virtual reality (virtual reality, VR) device, a laptop computer, an ultra-mobile personal computer (ultra-mobile personal computer, UMPC), a netbook, or a personal digital assistant (personal digital assistant, PDA). A specific type of the foldable mobile terminal is not limited in embodiments of this application.

Figure 1:
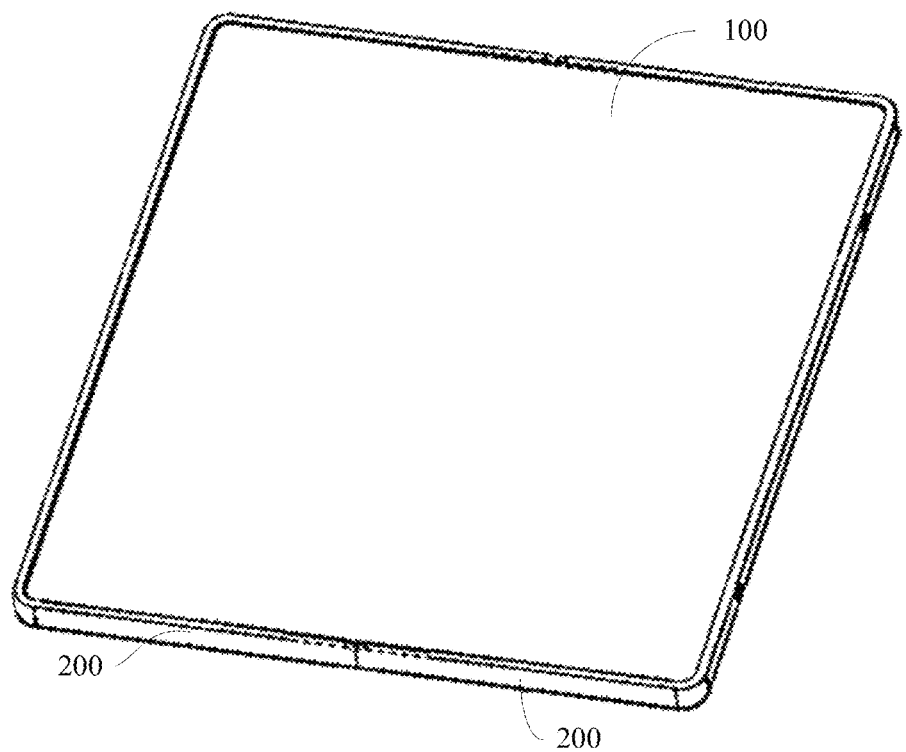
FIG. 1 is a three-dimensional schematic diagram of a foldable mobile terminal according to an embodiment of this application.
Figure 2:
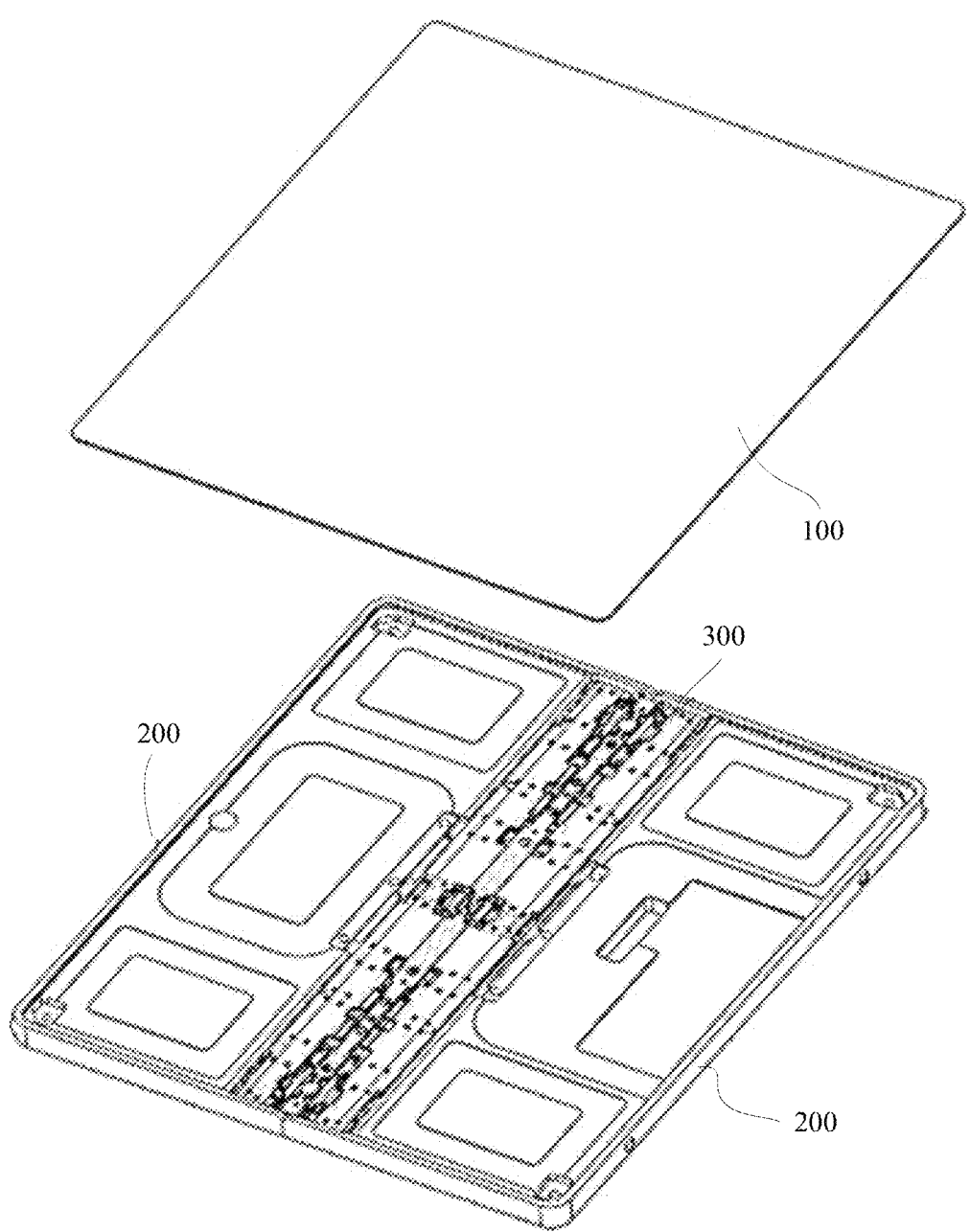
FIG. 2 is a schematic exploded view of the foldable mobile terminal shown in FIG. 1.

Refer to FIG. 1 and FIG. 2. In this embodiment, the foldable mobile terminal includes a rotating shaft mechanism 300, two main body parts 200, and a flexible display 100. The two main body parts 200 of the foldable mobile terminal are connected by using the rotating shaft mechanism 300, and the two main body parts 200 are rotated relative to each other by using the rotating shaft mechanism 300, so as to implement folding and unfolding of the foldable mobile terminal. Structures of the two main body parts 200 may be the same, or may not be completely the same. Specific structures of the two main body parts 200 may be determined based on a specific product, and are not specifically limited in this specification.

Figure 3:
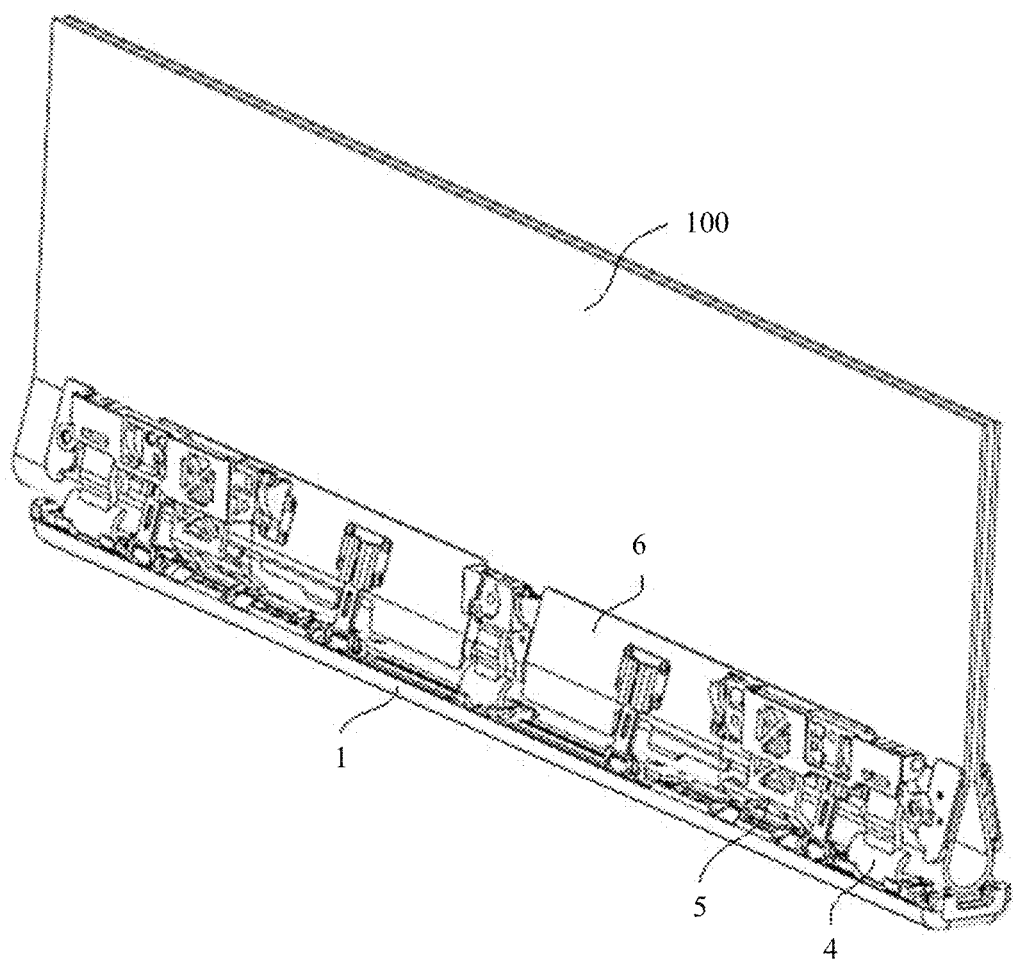
FIG. 3 is a schematic diagram of a rotating shaft mechanism and a flexible display in a folded state according to an embodiment of this application.

With reference to FIG. 3, in this embodiment, the flexible display 100 includes two fastening parts and one bending part. The two fastening parts can be combined with and fastened to the two main body parts 200. The bending part is disposed opposite to the main shaft body of the rotating shaft mechanism 300, and the bending part is not fastened to the main shaft body of the rotating shaft mechanism 300, so as to meet a bending deformation requirement of the bending part during folding. When the foldable mobile terminal is in a folded state, the bending part can be curved in an arc shape. As shown in FIG. 3, in a closed state, the bending part of the flexible display 100 is bent into a waterdrop shape. In this way, an R angle of the screen is large enough to avoid a large degree of bending, while the fastening parts on both sides can fit well with no gap, and a bending trace is minimized. Certainly, when the flexible display 100 is in a folded state, a folding shape of the bending part may be not limited to the waterdrop shape described in this specification, or may be in another form.

The flexible display 100 includes a display module and a transparent cover. The display module can display an image, a video, and the like. The display module may be a liquid crystal display (liquid crystal display, LCD), an organic light emitting diode (organic light-emitting diode, OLED), an active matrix organic light emitting diode (active-matrix organic light emitting diode, AMOLED), a flexible light emitting diode (flex light-emitting diode, FLED), a Miniled, a MicroLed, a Micro-OLED, a quantum dot light emitting diode (quantum dot light emitting diodes, QLED), or the like. The transparent cover covers an outer side of the display module to protect the display module. The transparent cover plate may be a glass cover plate, or may be another transparent material that can provide a protection function. The flexible display 100 may further have a touch function, that is, the flexible display 100 may be a touchscreen.

Figure 4:
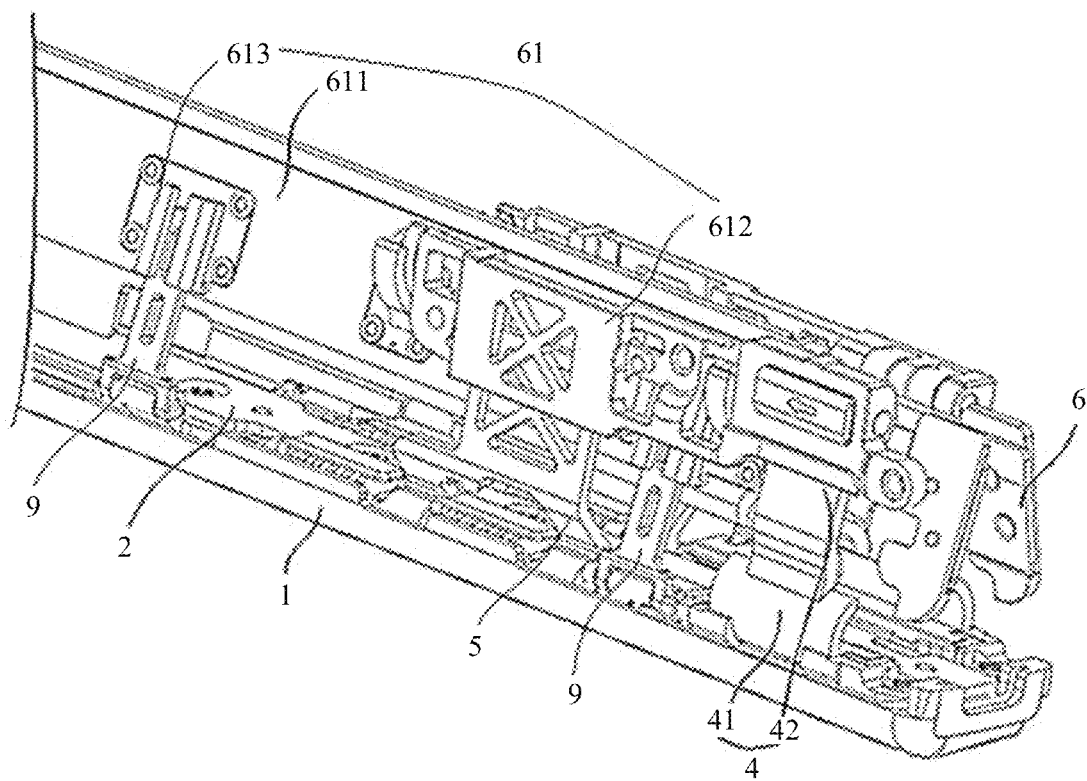
FIG. 4 is a partial schematic diagram of a rotating shaft mechanism according to an embodiment of this application.

Refer to FIG. 4, FIG. 5, and FIG. 6. In this embodiment, the rotating shaft mechanism 300 includes a shaft cover 1, a floating plate 2, a main swing arm 4, a first support 7, a second support 8, and an auxiliary swing arm 5. A cross section of the shaft cover 1 is approximately a U-shaped structure, a quantity of the first supports 7 and a quantity of the second supports 8 each is at least one, and the first support 7 is located at an end of the shaft cover 1. Each first support 7 and each second support 8 are mounted at an opening of the shaft cover 1. The shaft cover 1, the first support 7, and the second support 8 form a main shaft body, and provide a mounting base for each component of the rotating shaft mechanism 300. Other components in the rotating shaft mechanism 300 are basically mounted on an inner cavity of the shaft cover 1, and the shaft cover 1 is equivalent to a housing of the rotating shaft mechanism 300 to a certain extent. By properly setting an outer surface shape of the shaft cover 1, a beautiful outlook of the foldable mobile terminal may be formed together with the main body part 200.

In this embodiment, the rotating shaft mechanism 300 further includes at least one main swing arm 4 and at least one auxiliary swing arm 5. Refer to FIG. 5. The rotating shaft mechanism 300 includes N groups of main swing arm units, and each main swing arm unit includes two main swing arms that are symmetrically arranged with respect to the center longitudinal plane of the rotating shaft mechanism 300. Two, three, or more groups of main swing arm units may be arranged in an axial direction parallel to the rotating shaft mechanism. FIG. 5 shows that the rotating shaft mechanism includes three groups of main swing arm units, which are respectively located at both ends and in the middle of the rotating shaft mechanism 300. Similarly, the rotating shaft mechanism 300 includes M groups of auxiliary swing arm units, and each auxiliary swing arm unit includes two auxiliary swing arms that are symmetrically arranged with respect to the center longitudinal plane of the rotating shaft mechanism 300. Two, three, or more groups of auxiliary swing arm units may be arranged in an axial direction of the rotating shaft mechanism 300. FIG. 5 shows that the rotating shaft mechanism 300 includes two sets of auxiliary swing arm units, which are respectively located between adjacent main swing arm units.

Figure 7:
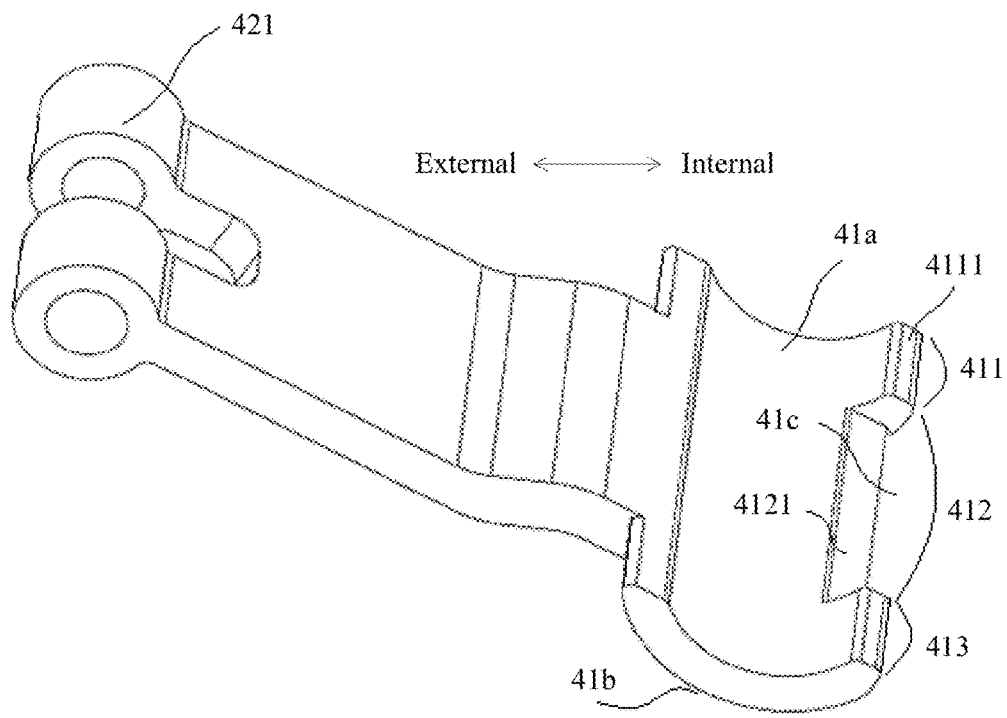
FIG. 7 is a three-dimensional diagram of a structure of a main swing arm according to an embodiment of this application.
Figure 8:
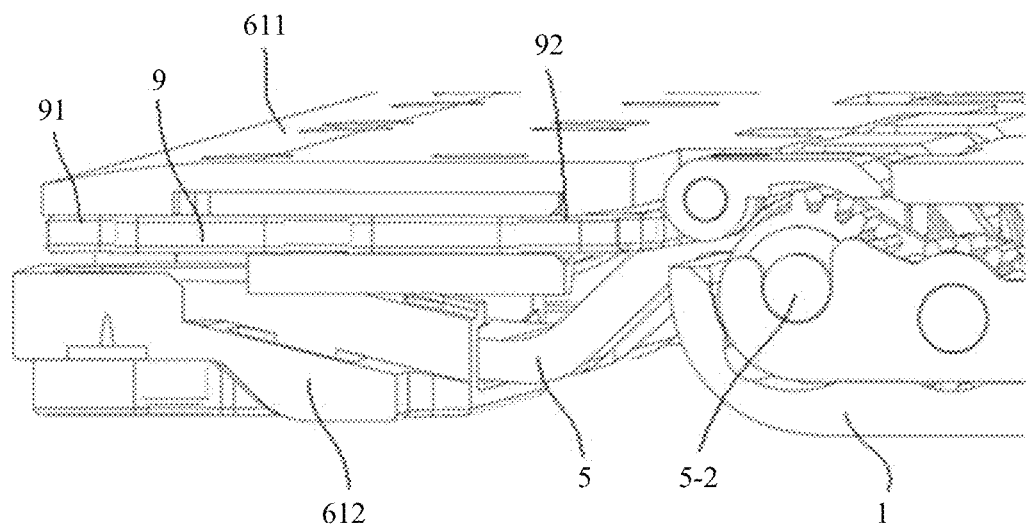
FIG. 8 is a three-dimensional schematic diagram of a partial structure in a sectional view taken along B_B in FIG. 5.

An inner end of the main swing arm 4 and an inner end of the auxiliary swing arm 5 are respectively rotatably connected to the first support 7 and the second support 8. Refer to FIG. 7. An outer end 42 of the main swing arm 4 is hinged or pivotally connected to a connecting plate assembly 6. That is, an outer end of the swing arm body 42 of the main swing arm 4 includes a base 421 with a hinge hole or a pivot hole, and the hinge hole or the pivot hole is parallel to the axial direction in which the main swing arm rotates. The connecting member 6 may be provided with a mounting structure that correspondingly cooperates with the main swing arm 4 for hinging or pivotal connection. Refer to FIG. 6. The left side and the right side of the rotating shaft mechanism are respectively connected to the first connecting plate assembly 61 and the second connecting plate assembly 62 by using the main swing arm 4 on the corresponding side, and the first connecting plate assembly 61 and the second connecting plate assembly 62 can move reciprocally between a folding position and an unfolding position with the main swing arm 4. In an example, the connecting plate assembly 6 includes at least one connecting plate and at least one wedge-shaped mounting base, and the wedge-shaped mounting base is fastened to the back of the connecting plate. Using the first connecting plate assembly 61 as an example, FIG. 4 shows that the first connecting plate assembly 61 includes at least one connecting plate 611, at least one wedge-shaped mounting base 612, and at least one door plate sliding base 613. An outer end of an auxiliary swing arm 5 is slidably connected to a wedge-shaped mounting base 612. That is, in a process in which the auxiliary swing arm 5 rotates around a rotating shaft of the auxiliary swing arm 5 and a rotating shaft of the support, an outer end of the auxiliary swing arm 5 moves reciprocally in a cooperation slide of the wedge-shaped mounting base 612, so as to guide movement of the wedge-shaped mounting base 612. Specific structures of the wedge-shaped mounting base 612 and the auxiliary swing arm 5 are not specifically limited in this specification.

The first connecting plate assembly 61 and the second connecting plate assembly 62 are respectively connected and fastened to two main body parts 200. For a manner of connecting the first connecting plate assembly 61 and the second connecting plate assembly 62 to the two main body parts 200, refer to the conventional technology. Details are not described in this specification. In this embodiment, a front surface of the connecting plate between the first connecting plate assembly 61 and the second connecting plate assembly 62 is fastened to a part of a fastening part of the flexible display 100, and may be fixedly connected to the flexible display 100 by using an adhesive. In addition, sizes of connecting plates in the first connecting plate assembly 61 and the second connecting plate assembly 62 are not limited in this specification, provided that a use requirement can be met.

In this embodiment, the main swing arm 4 is rotatably connected to the first support 7, and the auxiliary swing arm 5 is rotatably connected to the second support 8. That the first support 7 and the second support 8 are two parts of the support that are disposed in different positions in the rotating shaft mechanism 300 is merely used for briefly describing the technical solutions. The first support 7 and the second support 8 may be in an integrated structure, or may be in a split structure. The following continues to describe technical solutions and technical effects by using the example that the first support 7 and the second support 8 are in a split structure as an example.

Refer to FIG. 6 again. In an embodiment, a main swing arm 4 of a rotating shaft mechanism includes a swing arm body 42, a first end of the swing arm body 42 is provided with an arc-shaped tube 41. A slide that cooperates with the arc-shaped tube 41 is disposed on the first support 7, a large-diameter arc-shaped surface 41b, a small-diameter arc-shaped surface 41a of the arc-shaped tube 41, and a sliding track 7a form a Sliding pair. The arc-shaped tube 41 slides reciprocally in the slide 7a to meet a requirement of folding and unfolding of a foldable mobile terminal. When the arc-shaped tube 41 is mostly located in the sliding track 7a, the main swing arm 4 can be in the unfolded state. When only a part of the arc-shaped tube 41 is located in the slide 7a and the arc-shaped tube 41 mostly slides out of the slide 7a, the main swing arm 4 can meet a folding requirement of the foldable mobile terminal.

Refer to FIG. 7. The arc-shaped tube 41 includes two side edges that extend in an axial direction, and a side edge that is away from a first end of the swing arm body is provided with an opening 41c. When the rotating shaft mechanism is in the unfolded state, the floating plate is partially supported on a bottom wall of the opening 41c. That is, in the axial direction of the arc-shaped tube 41, the arc-shaped tube 41 includes a first arc-shaped body 411, a second arc-shaped body 412, and a third arc-shaped body 413 that are in contact with each other. The first arc-shaped body 411, the third arc-shaped body 413, and the second arc-shaped body 412 form an opening 41c, and an inner edge of the first arc-shaped body 411 and an inner edge of the third arc-shaped body 413 are higher than an inner edge of the second arc-shaped body 412. As shown in FIG. 7, the inner edge 4111 of the first arc-shaped segment 411 is obviously higher than the inner edge 4121 (the bottom wall of the opening) of the second arc-shaped body 412. In the cross section, the arc lengths of the first arc-shaped body 411 and the third arc-shaped body 413 are approximately equal, and are greater than the arc length of the second arc-shaped body 412, that is, the length of the arc-shaped segment of the cross section of the first arc-shaped body is greater than the length of the arc-shaped segment of the cross section of the second arc-shaped body. The cross section of the first arc-shaped body 411 is defined as a first arc-shaped segment, a center angle of the first arc-shaped segment is greater than or equal to 90 degrees, and a center angle of the first arc-shaped segment may be any value greater than or equal to 90 degrees. In this way, because the first arc-shaped body 411 and the third arc-shaped body 413 have a relatively long cooperation length in a rotation path, even if the main swing arm 4 rotates to the folded state, it can be ensured that the first arc-shaped body 411 and the third arc-shaped body 413 are at least partially located in the slide 7a, so as to prevent the main swing arm 4 from sliding out of the slide 7a.

In addition, as described above, when the foldable mobile terminal is in the unfolded state, the first arc-shaped body 411 and the third arc-shaped body 413 extend into arc-shaped segment of the slide 7a to the maximum extent. Correspondingly, the inner edge of the first arc-shaped body 411 and the third arc-shaped body 413 (the side edge away from the first end of the swing arm body 42) slides out of the slide 7a and is located at a high position. To avoid interference from the first arc-shaped body 411 and the third arc-shaped body 413 to the floating plate 2, the floating plate 2 is provided with an opening 24 to avoid the first arc-shaped body 411 and the third arc-shaped body 413. In this way, even if the main swing arm 4 is in the unfolded state, a partial area near the inner edge of the third arc-shaped body 413 and a partial area near the inner edge of the first arc-shaped body 411 may be located in the opening 24, so as to avoid the floating plate 2 in the screen supporting position. When in the unfolded state, an inner edge 4121 of the second arc-shaped body 412 that has a relatively short arc length abuts against the floating plate 2, so as to support the floating plate 2 in the screen supporting position.

It can be learned from the foregoing description that, in this embodiment, the arc-shaped tube 41 used by the main swing arm 4 to cooperate with the support in an axial direction to slide includes at least two parts: A first rotating segment and a second rotating segment, where a cooperation sliding length of the first rotating segment is greater than a cooperation sliding length of the second rotating segment. In this way, a longer first rotating segment can ensure that the rotating shaft mechanism is in the folded state and does not slide out of the slide of the support. That is, when the rotating shaft mechanism is in the folded state, the first rotating segment is at least partially located in the slide of the support. In addition, the floating plate includes an opening. When the main swing arm rotates to the unfolded state, the longer first rotating segment may be accommodated in the opening, and does not interfere with the floating plate 2; and the shorter second rotating segment can meet a requirement of supporting the floating plate 2 in the unfolded state. This can achieve support for the floating plate 2 in the main swing arm segment, and improve support stability of the floating plate 2, so as to ensure that a bending part of the flexible display 100 is evenly stressed.

In this embodiment, the arc-shaped tube 41 is not limited to including three segments: the first arc-shaped body 411, the second arc-shaped body 412, and the third arc-shaped body 413. The arc-shaped tube 41 may alternatively include two segments, for example, the first arc-shaped body 411 and the second arc-shaped body 412. Certainly, the arc-shaped tube 41 may alternatively include four or more segments. That is, the inner edge of the arc-shaped tube 41 is provided with at least two openings 41c, to form at least two first arc-shaped bodies 411 and at least two second arc-shaped bodies 412. That is, the first rotating segment includes at least one first arc-shaped body 411, and the second rotating segment includes at least one second arc-shaped body 412.

In this embodiment, an elastic member may be further added between the floating plate 2 and the support. When the rotating shaft mechanism rotates from the unfolded state to the folded state, the floating plate may fall from the screen supporting position to a folding station under the action of a restoring force of the elastic member. A specific structure of the elastic member is not described in detail in this specification. Please refer to the existing materials.

Structures of the first support 7 and the second support 8 are not limited to the descriptions in this specification, but may be another structure, provided that the foregoing use requirement is met.

In this embodiment, the main swing arm 4 and the auxiliary swing arm 5 are usually spaced. Therefore, in addition to disposing a support structure of the floating plate 2 on the main swing arm 4, a structure that is used to support the floating plate 2 that is in the unfolded state may be further disposed on the auxiliary swing arm 5.

In this embodiment, a first support block 5-1 is fixedly connected to an inner end of the auxiliary swing arm 5, and the first support block 5-1 may be integrally formed with the auxiliary swing arm 5, or may be fixedly connected to the auxiliary swing arm 5 through bonding or welding. The first support block 5-1 includes a first support surface (not shown in the figure, refer to a structure of the second support surface in the following), and the floating plate 2 includes a first support part 21 that extends in a horizontal direction. The horizontal direction refers to a direction perpendicular to an axial direction of the rotating shaft mechanism. When the auxiliary swing arm 5 gradually unfolds, the first support surface rotates with the auxiliary swing arm to drive the floating plate to gradually move up to the screen supporting position. To improve rotation flexibility of the rotating shaft mechanism, the first support surface may be of a streamlined type. When the auxiliary swing arm is in the unfolded state, a partial area of the first support surface is adhesively supported on the floating plate, so as to improve support stability. In an example in which the bottom wall of the first support part is a plane, the first support surface may also include a plane that abuts against the bottom wall of the first support part 21.

In this embodiment, in the unfolded state, the auxiliary swing arm 5 and the main swing arm 4 jointly support the floating plate 2, and the floating plate 2 has many supporting points, and therefore stability is high.

Refer to FIG. 8 to FIG. 12. In this embodiment, a connecting shaft body 5-2 is fixedly connected to an inner end of the auxiliary swing arm 5, and the auxiliary swing arm 5 is rotatably connected to the second support 8 by using the connecting shaft body 5-2. A second support block 5-3 is further disposed at an end of the connecting shaft body 5-2 that is away from the first support block 5-1. The second support block 5-3 can rotate synchronously with the connecting shaft body 5-2. The second support block 5-3 further includes a second support surface. The floating plate 2 includes a second support part 22 that extends in a horizontal direction. When the rotating shaft mechanism is in the unfolded state, the second support part 22 of the floating plate 2 is further supported on the second support surface. A shape of the second support surface may be similar to a shape of the first support surface, including a curved surface 2-32 that cooperates on rotation and a cooperation surface 5-31 that can stably support the floating plate. In this embodiment, the cooperation surface 5-31 is a plane.

Figure 9:
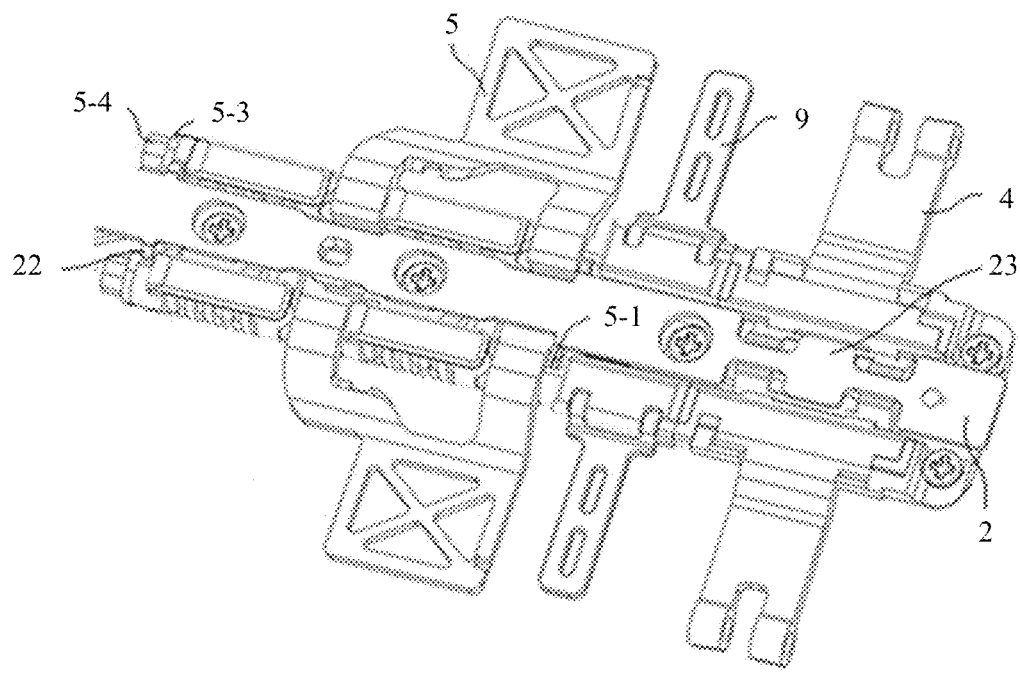
FIG. 9 is a schematic diagram of a structure of a part of a rotating shaft mechanism according to an embodiment of this application, which mainly shows main components such as an auxiliary swing arm, a door plate sliding block, a main swing arm, and a floating plate that are mounted on a support.

The second support block 5-3 and the connecting shaft body 5-2 can be positioned in many ways. For example, the second support block 5-3 and the connecting shaft body 5-2 may be completely fixedly connected to each other, or may be detachably connected to each other. In an example, the second support block 5-3 includes a mounting through hole 5-33, the connecting shaft body 5-2 includes a mounting shaft segment that cooperates with the mounting through hole 5-33, and a cross section of the mounting through hole 5-33 is a non-circular structure. Certainly, the mounting shaft segment also includes a mounting surface that matches the mounting through hole 5-33, to limit relative rotation of the second support block 5-3 and the mounting shaft segment in a circumferential direction. Axial positioning of the second support block 5-3 and the mounting shaft segment may be implemented by using a limiting member. The limiting member may be selected based on a component mounted on the connecting shaft body, and may be a bolt or a nut 5-4. Refer to FIG. 9. FIG. 9 shows a specific example in which the second support block 5-3 is clamped between a nut 5-33 and a cam spring assembly. Certainly, an axial positioning manner of the second support block 5-3 is not limited to the descriptions in this specification.

In this way, the first support block 5-1 and the second support block 5-3 that are fixedly connected to the auxiliary swing arm 5, and the main swing arm 4 can support the floating plate 2 in the unfolded state simultaneously. The floating plate 2 has many supporting points in a length direction of the floating plate 2 and is evenly stressed, and therefore stability is high.

Figure 10:
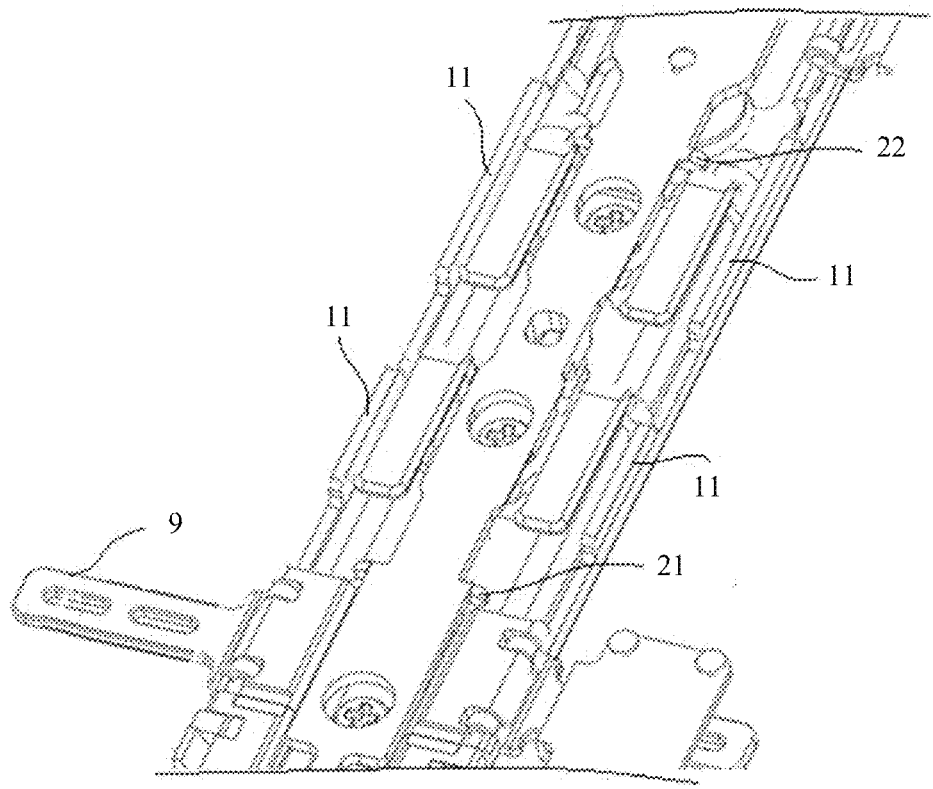
FIG. 10 is a schematic diagram of a structure of a part of a rotating shaft mechanism according to an embodiment of this application, which mainly shows positions of a first support block and a second support block that support a floating plate.
Figure 11:
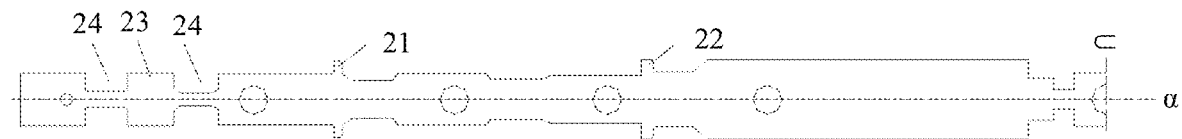
FIG. 11 is a partial top view of a floating plate according to an embodiment of this application, where only half of the structure of the floating plate is shown, and the other part is the same as the structure of the part, and the first part and the other part are symmetrical with respect to the axis c.
Figure 12:
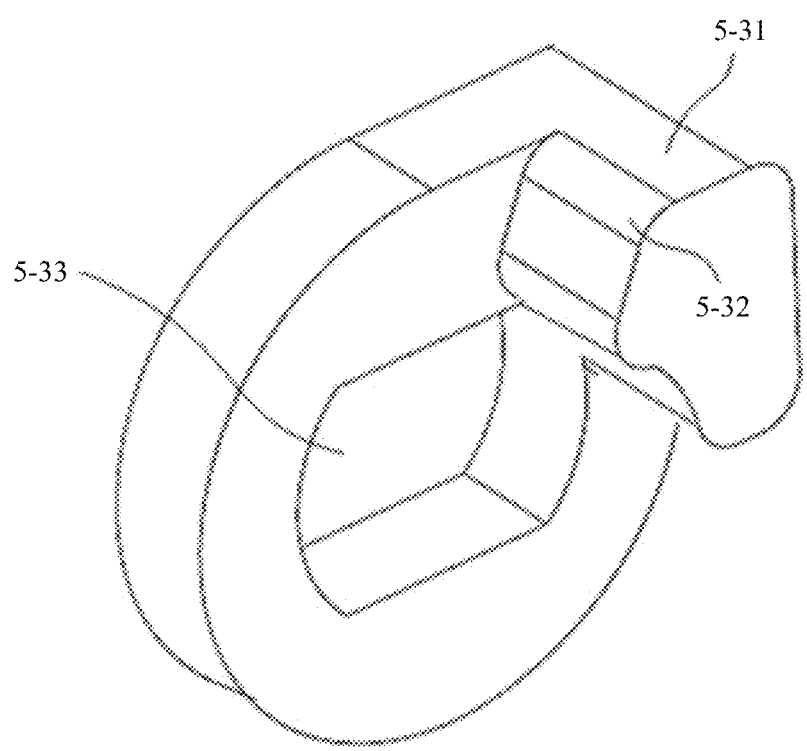
FIG. 12 is a three-dimensional schematic diagram of a structure of a second support block according to an embodiment of this application.

Refer to FIG. 10. In this embodiment, at least one support protrusion 11 is disposed on both side walls of the shaft cover 1 that extend in an axial direction, and is configured to support the connecting plate assembly 6 in the unfolded state. The support protrusion 11 may be supported on the connecting plate of the connecting plate assembly. In this way, the support protrusion 11 can improve stability the connecting plate to a certain extent. A disposing position, a length, and a quantity of the support protrusions 11 on the shaft cover 1 may be properly selected based on a specific structure of the rotating shaft mechanism.

When the rotating shaft mechanism is in the unfolded state, the stability of the connecting plate is also an important parameter that affects the performance of the foldable mobile terminal.

Refer to FIG. 3, FIG. 4, and FIG. 8 again. In this embodiment, the rotating shaft mechanism further includes door plate sliding blocks 9 on the left side and the right side of the support. A quantity of the door plate sliding blocks 9 is not limited, and may be determined based on a specific product. As described above, the connecting plate assembly 6 includes a connecting plate and a wedge-shaped mounting base fixedly connected to the back of the connecting plate; and an outer end of the auxiliary swing arm 5 is slidably connected to the wedge-shaped mounting base, that is, an outer end of the auxiliary swing arm is slidably disposed in a cooperation slide of the wedge-shaped mounting base. An inner end of the door plate sliding block 9 is rotatably connected to the support by using a pin or a pin shaft, and a sliding groove that cooperates with the door plate sliding block 9 to slide is further formed on the back of the connecting plate. In an example, a sliding base 613 is mounted on the back of the connecting plate, and a sliding groove is formed on the sliding base 613. In addition, when the rotating shaft mechanism is in the unfolded state, the door plate sliding block 9 is in a horizontal state, and both the inner end and the outer end of the door plate sliding block are located outside the sliding groove, and both abut against and support the connecting plate. That is, in the unfolded state, the inner end and the outer end of the connecting plate may be supported on the door plate sliding block 9 in the horizontal state, to increase support stability of the connecting plate, so that a surface that is of the connecting plate and that is opposite to the flexible display is in a horizontal state. A cooperation surface that is of the door plate sliding block 9 and that abuts against and supports the connecting plate may be in many shapes, for example, a plane or an inclined plane, provided that the foregoing technical effects can be achieved.

In this embodiment, a surface of the door plate sliding block 9 that supports the connecting plate may be a plane with a simple structure.

For another structure of the foldable mobile terminal, refer to the conventional technology. Details are not described herein again.

A specific example is used in this specification to describe principles and implementations of the utility model. The foregoing embodiments are merely used to help understand the method and the core idea of the utility model. It should be noted that a person of ordinary skill in the art may make several improvements or modifications to the utility model without departing from the principles of the utility model, and these improvements or modifications shall fall within the protection scope of the claims of the utility model.

What is claimed is:

1. A rotating shaft mechanism, applied to a foldable mobile terminal, comprising:
   a first support, a slide is disposed in the first support;
   a floating plate, located at one side of the first support;
   a main swing arm, comprising a swing arm body, a first end of the swing arm body is provided with a rotating body that is configured to cooperate with the slide in the first support, the rotating body comprises a first rotating segment and a second rotating segment in an axial direction of the rotating body, and when the rotating shaft mechanism is in a folded state, the first rotating segment is at least partially located in the slide; and
   when the rotating shaft mechanism is in an unfolded state, the second rotating segment is configured to support at least the floating plate, the floating plate includes an opening for avoiding the first rotating segment.

2. The rotating shaft mechanism according to claim 1, wherein in an axial direction of the rotating body, the rotating body comprises at least one first arc-shaped body and at least one second arc-shaped body;
   the at least one first arc-shaped body and the at least one second arc-shaped body are coaxial and have a same cross section of a circular arc-shaped segment;
   a circular arc-shaped segment length of the at least one first arc-shaped body is greater than a circular arc-shaped segment length of the at least one second arc-shaped body;
   the first rotating segment comprises the at least one first arc-shaped body, and the second rotating segment comprises the at least one second arc-shaped body, the second arc-shaped body configured to support the floating plate, and arc-shaped surfaces on both sides of the at least one first arc-shaped body and the at least one second arc-shaped body are configured to cooperate with the slide to rotate.

3. The rotating shaft mechanism according to claim 1, wherein the rotating body includes an arc-shaped tube, the arc-shaped tube includes two side edges that extend in the axial direction of the rotating body, a side edge that is away from the first end of the swing arm body is provided with an opening, and a bottom wall of the opening is configured to support the floating plate when the rotating shaft mechanism is in the unfolded state.

4. The rotating shaft mechanism according to claim 3, the arc-shaped tube is a part of tube.

5. The rotating shaft mechanism according to claim 3, a large-diameter arc-shaped surface, a small-diameter arc-shaped surface of the arc-shaped tube, and the slide of the first support form a sliding pair.

6. The rotating shaft mechanism according to claims 3, the arc-shaped tube includes a first arc-shaped body and a second arc-shaped body that are in contact with each other, an side edge of the first arc-shaped body away from the first end of the swing arm body is higher than an side edge of the second arc-shaped body away from the first end of the swing arm body, the side edge of the second arc-shaped body away from the first end of the swing arm body forms the bottom wall of the opening, when the rotating shaft mechanism is in the folded state, the first arc-shaped body is at least partially located in the slide.

7. The rotating shaft mechanism according to claim 6, the side edge of the arc-shaped tube away from the first end of the swing arm body is provided with at least two openings, to form at least two first arc-shaped bodies and at least two second arc-shaped bodies.

8. The rotating shaft mechanism according to claim 6, the arc-shaped tube includes a third arc-shaped body, the third arc-shaped body is located at one side of the second arc-shaped body away from the first arc-shaped body, an side edge of the third arc-shaped body away from the first end of the swing arm body is higher than the side edge of the second arc-shaped body away from the first end of the swing arm body.

9. The rotating shaft mechanism according to claim 8, arc lengths of the first arc-shaped body and the third arc-shaped body are greater than arc length of the second arc-shaped body, when the rotating shaft mechanism is in the folded state, the first arc-shaped body and the third arc-shaped body are at least partially located in the slide.

10. The rotating shaft mechanism according to claim 1, wherein a cross section of the first arc-shaped body is a first arc-shaped segment, and a center angle of the first arc-shaped segment is greater than or equal to 90 degrees.

11. The rotating shaft mechanism according to claim 1, a second end of the swing arm body is provided with a mounting hole that is configured to be hinged or pivotally connected to a connecting plate assembly of the rotating shaft mechanism, and the mounting hole is parallel to the axial direction of the rotating body.

12. The rotating shaft mechanism according to claim 11, further comprising a shaft cover, a second support and an auxiliary swing arm, the first support and the second support are mounted at an opening of the shaft cover, the auxiliary swing arm is rotatably connected to the second support, the connecting plate assembly includes at least one connecting plate and at least one wedge-shaped mounting base, an outer end of an auxiliary swing arm is slidably connected to a wedge-shaped mounting base.

13. The rotating shaft mechanism according to claim 12, further comprising a first support block fastened to the auxiliary swing arm, wherein the first support block comprises a first support surface, the floating plate comprises a first support part that extends in a horizontal direction, and when the auxiliary swing arm gradually unfolds, the first support surface rotates with the auxiliary swing arm to drive the floating plate to gradually move up and support the floating plate in a screen supporting position.

14. The rotating shaft mechanism according to claim 13, wherein an inner end of the auxiliary swing arm is fixedly connected to a connecting shaft body, and the auxiliary swing arm is rotatably connected to the second support by using the connecting shaft body;
   a second support block is further disposed at an end that is of the connecting shaft body and that is away from the first support block, and the second support block is configured to rotate synchronously with the connecting shaft body;
   the second support block further comprises a second support surface, and the floating plate comprises a second support part that extends in a horizontal direction; and when the rotating shaft mechanism is in the unfolded state, the second support part of the floating plate is further supported on the second support surface.

15. The rotating shaft mechanism according to claim 14, wherein the second support block comprises a mounting through hole, the connecting shaft body comprises a mounting shaft segment that cooperates with the mounting through hole, a cross section of the mounting through hole is a non-circular structure, so as to limit circumferential rotation of the second support block relative to the connecting shaft body.

16. The rotating shaft mechanism according to claim 12, wherein a length of the floating plate is equal to a length of the connecting plate along the axial direction of the rotating body, or two ends of the floating plate are respectively aligned with two ends of the connecting plate along the axial direction of the rotating body.

17. The rotating shaft mechanism according to claim 1, the floating plate is provided with a wide section and a narrow section along the axial direction of the rotating body, two ends of the narrow section are respectively provided with the wide section, and on the same side of the floating plate, the narrow section and the wide sections at both ends of the narrow section surround to form an opening for the floating plate to avoid the first rotating segment.

18. The rotating shaft mechanism according to claim 1, the rotating shaft mechanism includes N groups of main swing arm units, and each main swing arm unit includes two main swing arms that are symmetrically arranged with respect to the center longitudinal plane of the rotating shaft mechanism.

19. The rotating shaft mechanism according to claim 18, a left side and a right side of the rotating shaft mechanism are respectively connected to a first connecting plate assembly a second connecting plate assembly by using the main swing arm on the corresponding side, and the first connecting plate assembly and the second connecting plate assembly is configured to move reciprocally between a folding position and an unfolding position with the main swing arm.

20. A foldable mobile terminal, comprising the rotating shaft mechanism according to claim 1.

* * * * *